United States Patent
Grigo et al.

(10) Patent No.: US 6,325,042 B1
(45) Date of Patent: Dec. 4, 2001

(54) SPARK-IGNITION PISTON COMBUSTION ENGINE WITH DIRECT FUEL INJECTION

(75) Inventors: Michael Grigo, Stolberg; Oliver Richarz, Linnich; Joachim Altdorf, Köln; Christoph Bollig, Aachen; Kurt Imren Yapici, Eschweiler, all of (DE)

(73) Assignee: Fev Motorentechnik GmbH, Aachen (DE)

( * ) Notice: Subject to any disclaimer, the term of this patent is extended or adjusted under 35 U.S.C. 154(b) by 0 days.

(21) Appl. No.: 09/485,844

(22) PCT Filed: Jun. 7, 1999

(86) PCT No.: PCT/EP99/03903

§ 371 Date: Feb. 17, 2000

§ 102(e) Date: Feb. 17, 2000

(87) PCT Pub. No.: WO99/65286

PCT Pub. Date: Dec. 23, 1999

(30) Foreign Application Priority Data

Jun. 18, 1998 (DE) .......................................... 298 10 897 U

(51) Int. Cl.[7] .................................................. F02B 23/10
(52) U.S. Cl. ............................................ 123/302; 123/305
(58) Field of Search ..................................... 123/276, 298, 123/301, 302, 305

(56) References Cited

U.S. PATENT DOCUMENTS

| | | | |
|---|---|---|---|
| 5,115,774 | 5/1992 | Nomura et al. ....................... | 123/276 |
| 5,724,927 | 3/1998 | Suzuki ............................... | 123/90.15 |
| 5,816,215 | * 10/1998 | Yoshikawa et al. ............... | 123/302 X |
| 6,006,719 | * 12/1999 | Matsumura .......................... | 123/302 |
| 6,009,849 | * 1/2000 | Yamamoto et al. ............... | 123/305 X |

FOREIGN PATENT DOCUMENTS

| | | |
|---|---|---|
| 197 13 030 | 10/1997 | (DE) . |
| 198 04 161 | 8/1998 | (DE) . |
| 0 824 185 | 8/1997 | (EP) . |
| 0 879 942 | 11/1998 | (EP) . |
| 0 881 369 | 12/1998 | (EP) . |
| 10238352 | 9/1998 | (JP) . |

* cited by examiner

*Primary Examiner*—Tony M. Argenbright
(74) *Attorney, Agent, or Firm*—Venable; Gabor J. Kelemen

(57) ABSTRACT

An internal combustion engine includes a plurality of cylinders defining combustion chambers each having a roof provided in the cylinder head. Each roof is composed of first and second inclined roof surfaces meeting in a ridge line. Two gas intake openings terminate in respective free edges on the first roof surface and at least one gas exhaust opening terminates in a free edge on the second roof surface. Respective gas exchange valves are seatable in the gas intake and gas exhaust openings. A fuel injection nozzle and a spark plug are supported in the cylinder head in a region of the roof. The first roof surface has, adjacent the fuel injection nozzle, a shoulder covering a terminal edge of the cylinders and extending into each combustion chamber. The shoulder has a front face transverse to the nozzle axis. The free edge of the gas intake openings intersects the ridge line.

9 Claims, 3 Drawing Sheets

SPARK-IGNITION PISTON COMBUSTION ENGINE WITH DIRECT FUEL INJECTION

Figure 1:
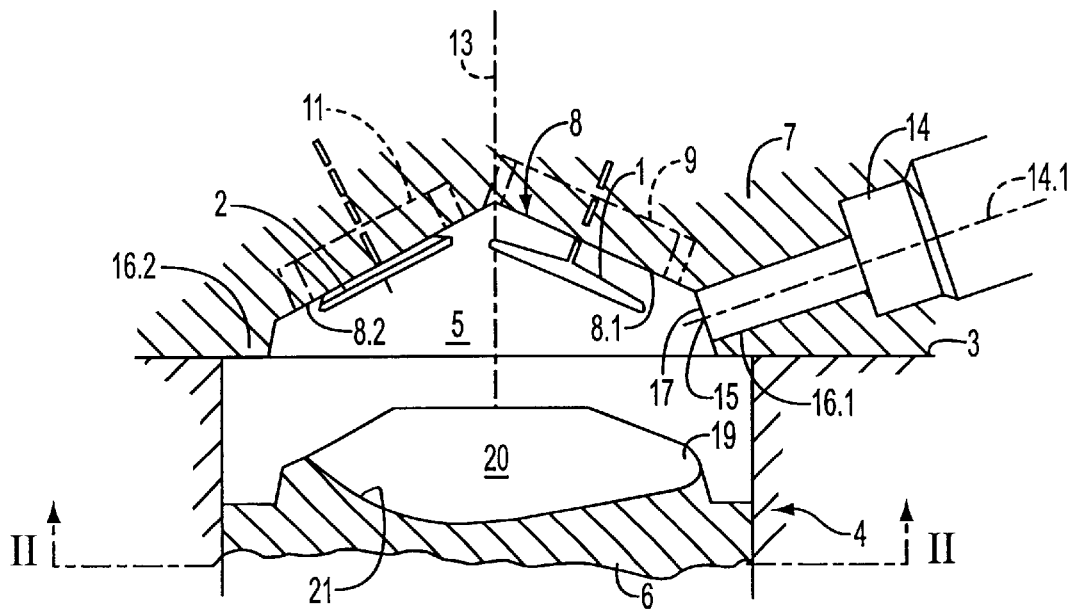

A direct fuel injected reciprocating internal combustion engine with externally supplied ignition constitutes a complicated system in regard to the arrangement of the charge cycle ports, the valve gears and the piston recess, whose design is additionally made more difficult, because it is necessary to place the injection nozzle at a defined position in view of an optimal mixture formation, which must take place within the combustion chamber. In connection with reciprocating internal combustion engines with two gas intake valves, the space for this is offered below the intake ports between the gas intake valves. However, this arrangement requires special structural steps.

A reciprocating internal combustion engine with externally supplied ignition and direct fuel injection is known from DE 197 41 380 A, wherein a fuel injection nozzle terminates in the combustion chamber between two gas intake valves. This arrangement is particularly provided for a charge cycle operation. However, it has been shown that with this arrangement of the gas intake valves in association with the fuel injection nozzle, the valve disks of the gas intake valves are struck to a greater or lesser extent by the injected fuel jet during so-called homogeneous operation, i.e. in the course of fuel injection during the induction stroke with fully open gas intake valves. Because of this, portions of the fuel jet are screened off. A perfect mixture formation as a whole in not possible. This can lead to disturbing blake smoke formation in a homogeneous operation, in particular at stoichiometric or below stoichiometric excess air factors.

The object of the invention is based on creating a thermodynamically advantageous concept for such a reciprocating internal combustion engine, by means of which the formation of black smoke can be at least reduced.

In connection with a reciprocating internal combustion engine with externally supplied ignition having the characteristics of the preamble of claim 1, this object is attained in accordance with the invention, in that the roof surface of the combustion chamber roof has a shoulder in the area of the mouth of the fuel injection nozzle, which extends into the combustion chamber, covers the edge of the cylinder in the end plane, and has a front face which is oriented transversely in respect to the axis of the fuel injection nozzle and is more steeply angled in respect to the roof surface. In a preferred embodiment it is provided that the gas intake openings are arranged displaced in the direction toward the ridge line and laterally outward. By means of the arrangement of the fuel injection nozzle in accordance with the invention, it is achieved in a particularly effective manner through the positioning of the gas intake openings in the direction toward the gas exhaust side, that the gas intake openings are located higher in relation to the mouth of the fuel injection nozzle and are also further apart, so that with appropriate dimensions of the diameters of the gas intake openings when the gas intake valves are open, the valve disks of the latter can no longer be struck by the fuel jet. During homogeneous operation an engine operation, which is free of black smoke to a great extent, is possible even at excess air factors of <1 with this. The shape of the combustion chamber resulting from this can be designed to be slightly asymmetric in relation to a vertical section.

Further embodiments of the invention are recited in the dependent claims and can be taken from the description of exemplary embodiments.

A particular embodiment is recited in claim 11. With this attainment of the object it is possible to provide the required space for the injection nozzle below the gas intake ports in that the entire valve gear is pivoted toward the exhaust side. The shape of the combustion chamber roof resulting from this is asymmetric.

The invention will be explained in greater detail by means of schematic drawings of exemplary embodiments. Shown are in:

FIG. 1, a vertical section through the upper area of a cylinder in accordance with the line I—I in FIG. 2, FIG. 2, a cross section through the cylinder in accordance with the line II—II on FIG. 1, FIG. 3, a view from below on the piston bottom, FIG. 4, a vertical section through the upper area of a cylinder of an embodiment with a pivoted valve angle.

A vertical section through a cylinder 4 of a reciprocating internal combustion engine with externally supplied ignition and direct fuel injection, which is provided with two gas intake valves 1 and two gas exhaust valves 2, is represented in FIG. 1. The gas intake valves 1 and the gas exhaust valves 2 are arranged in a cylinder head and are only suggested in the drawing, namely the gas intake valve 1 in an opened position and the gas exhaust valve 2 in a closed position. The cylinder head is tightly seated on an end plane 3 of the cylinder 4.

The combustion chamber 5 of the represented cylinder is delimited on the one side by the piston 6, and on the other side by a combustion chamber roof 8 formed in the cylinder head 7. A vertical plane extending perpendicularly in relation to the drawing plane is defined by the cylinder axis 13. The combustion chamber roof is delimited by two roof surfaces 8.1 and 8.2, which rise at an angle toward the vertical plane defined by the cylinder axis 13, and in which gas intake openings 9 are arranged on the gas intake side, through which the gas intake ports terminate into the combustion chamber 5. Two gas exhaust openings 11, which are connected with gas exhaust ports, are correspondingly arranged on the gas exhaust side. On the combustion chamber side the gas intake openings 9 and the gas exhaust openings 11 are delimited by the valve seats for the gas intake valves 1 and the gas exhaust valves 2.

A fuel injection device 14, whose nozzle 15 terminates in the combustion chamber 5, is arranged in the area below and between the two gas intake valves 1. In order to now achieve an optimal arrangement of the fuel injection device and an optimal orientation of the fuel jet exiting from the nozzle 15 into the combustion chamber 5, in the exemplary embodiment represented here, and as can be seen from the sectional view in FIG. 1, the roof surface 8.1, as well as the roof surface 8.2, of the combustion chamber roof are provided with shoulders 16.1 and 16.2, which extend into the combustion chamber. In the area of the mouth 15 of the fuel injection nozzle 14, the shoulder has a front face 17, which is oriented transversely, preferably perpendicularly in relation to the axis 14.1 of the fuel injection nozzle 14 and is more steeply angled in relation to the roof surface 8.1. A circular shape for the mouth of the insertion opening for this fuel injection nozzle 14 results from this which, if need be, may have a conically widened end portion 14.2 (FIG. 4) when the fuel injection nozzle is slightly pulled back.

Figure 2:
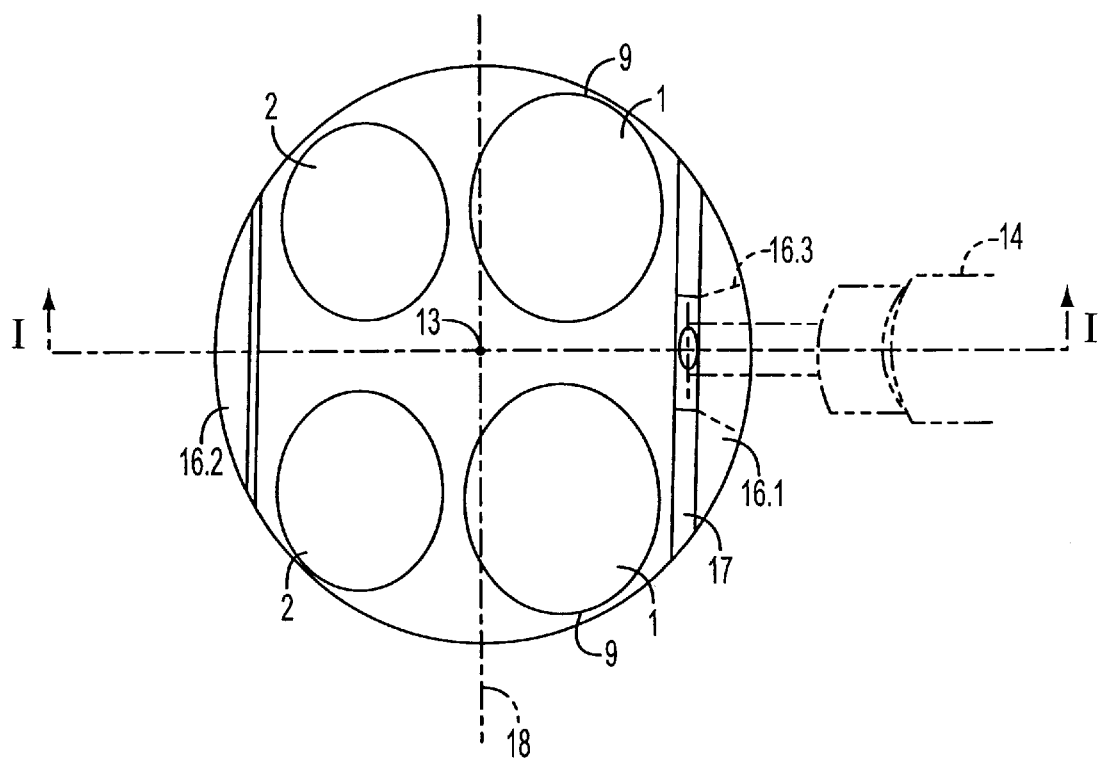

As the schematic bottom view in accordance with FIG. 2 shows, the gas intake valves 1 are displaced in the direction of the ridge line 18 formed by the two roof surfaces 8.1 and 8.2, i.e. in the direction toward the gas exhaust side. At the same time the gas intake valves 1 are also outwardly displaced as far as the outer edge of the cylinder walls leading into the area of the combustion chamber roof. In this case the displacement in the direction toward the ridge line 18 can be made sufficiently large, so that the free edge of the gas intake openings touches or even intersects the ridge line 18. With the appropriate dimensioning of the valve disks, the fuel jet from the fuel injection device 14 can enter into the combustion chamber, when the gas intake valve 1 is open, in such a way that the valve disks of the gas intake valves 1 are not struck. The particular advantage of this arrangement of the fuel injection device 14 also lies inter alia in that the nozzle mouth 15 does not extend into the combustion chamber, possibly can even be retracted by a small amount in relation to the plane of the front surface 17, so that in this way it is somewhat protected against thermal stresses when the fuel- air mixture is ignited.

While it is possible in principle to design the shoulder 16 only in the form of a butt projecting into the combustion chamber, as indicated by the dashed line 16.3 in FIG. 2, it is particularly useful if the shoulder is constituted by an angling of the roof surface extending parallel with the ridge line 18 and covering the cylinder edge in the end plane 3. In this way the shoulder extending over this area, acting together with a corresponding design of the piston bottom of the piston 6, forms a desired pinching surface on the gas intake side, as well as on the gas exhaust side.

Figure 3:
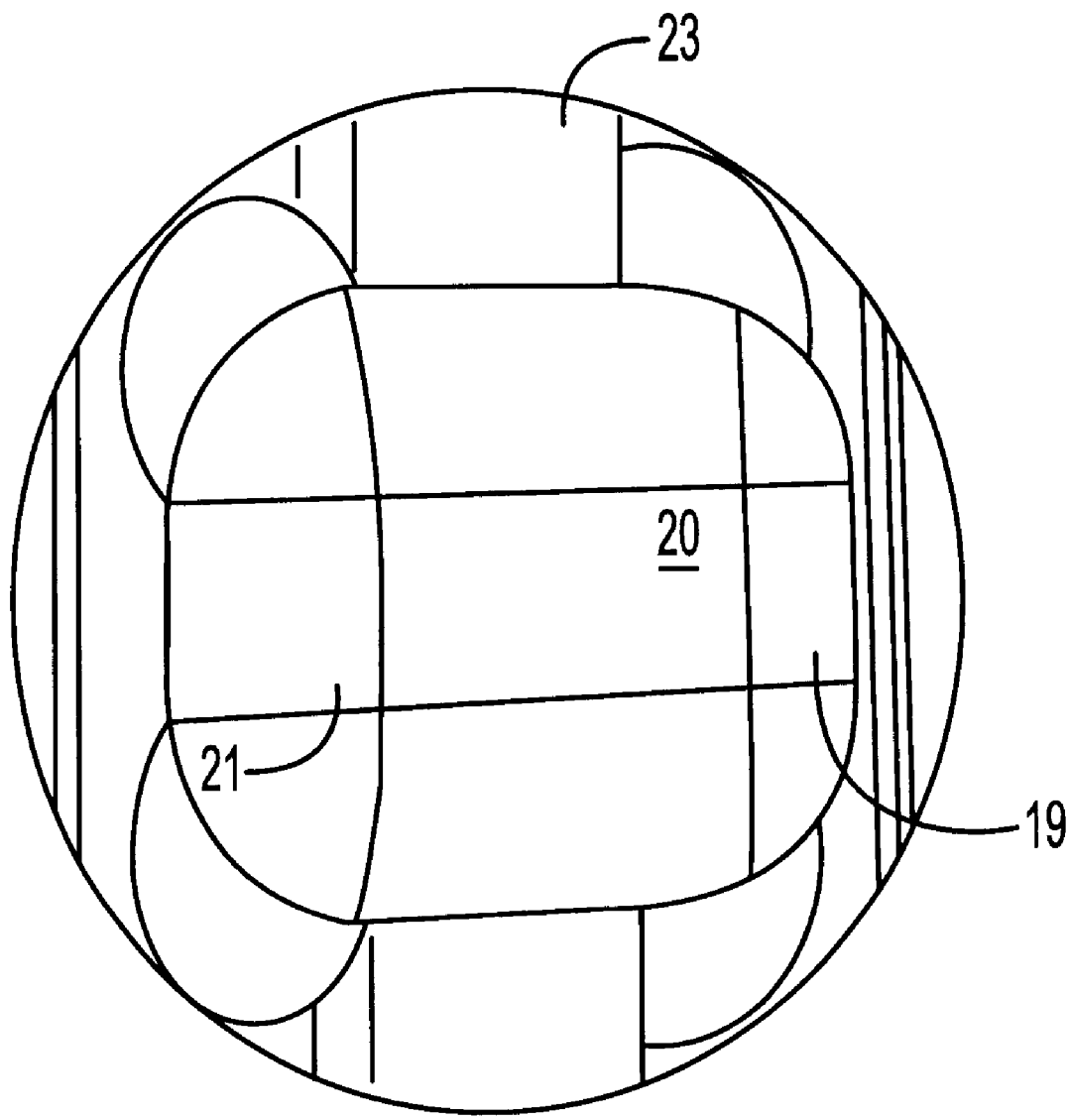

As the section in FIG. 1 in connection with the view from below on the piston 6 in accordance with FIG. 3 show, the piston bottom of the piston 6 is designed in a roof shape corresponding to the combustion chamber roof, but is provided with a trough-shaped recess 20 extending transversely in relation to the roof surfaces, extending from the gas intake valves 1 and descending in the direction toward the gas exhaust valves 2. The edge of the trough-shaped recess 20 has a cutout 19 in the area of the mouth of the nozzle 15 of the fuel injection device 14. In the edge area of the end 21 facing the gas exhaust valves 2, the bottom of the recess 20 extends upwardly curved. The piston bottom on both sides of the recess 20 is provided with a flattening 23 in the ridge area.

Figure 4:
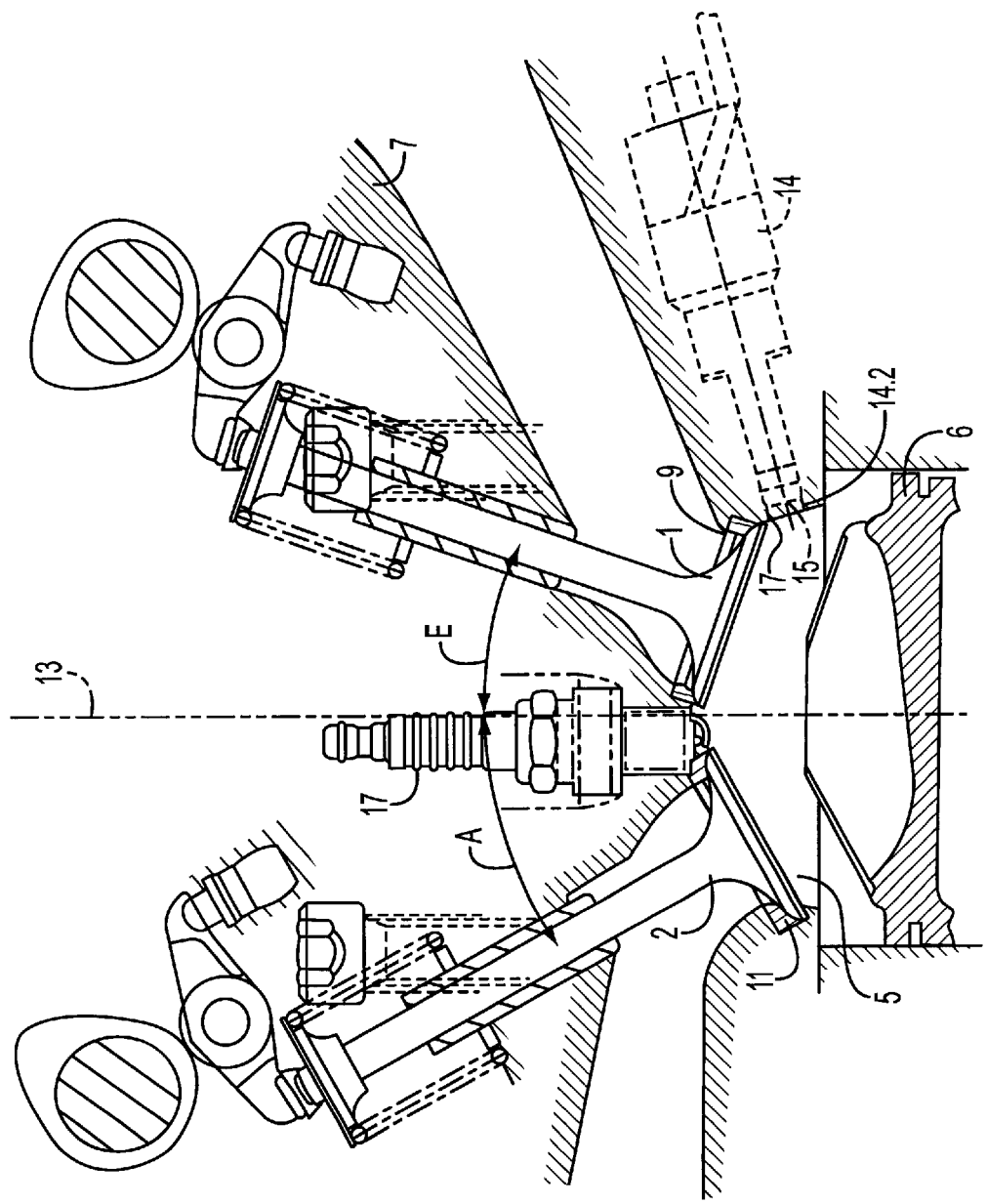

An embodiment is represented in FIG. 4 which, starting from the schematic vertical section in accordance with FIG. 1, shows a special arrangement of the valves. In the exemplary embodiment represented here, the entire valve arrangement is asymmetrically arranged in relation to the vertical plane defined by the cylinder axis 13. Here, the gas intake valves 1 occupy a valve angle E of preferably approximately 20 degrees in relation to the vertical plane through the cylinder axis 13. In this case, the gas exhaust valves 2 occupy a valve angle A of preferably approximately 30 degrees in respect to the vertical plane, so that the entire angle between the intake valves and the exhaust valves is approximately 50 degrees. A certain asymmetry of the combustion chamber roof 8 in respect to the vertical plane also arises from this, so that the lower edge of the valve seat of the gas intake valves 1 is slightly raised in relation to the end plane 3 of the cylinder, and in this way sufficient free space is available for the arrangement of the fuel injection device 14.

In this arrangement a spark plug 17 is arranged laterally offset in relation to the cylinder axis 13 on the side of the vertical plane facing the gas exhaust valves 2.

To provide the required space for the injection nozzle underneath the gas intake ports, the entire valve gear is pivoted towards the exhaust side, so that the valve angles of 20 degrees for the intake and 30 degrees for the exhaust result. It is achieved by this that sufficient space is provided in the combustion chamber for housing the fuel injection device, as well as for the opening for the mouth of the fuel injection nozzle in the combustion chamber arranged between the two gas intake openings. The shape of the combustion chamber roof resulting from this is also asymmetric.

Because of the layout of the piston recess with its obliquely descending piston bottom, the tumble, i.e. the intake flow rotating around an axis oriented transversely in relation to the cylinder axis 13, is stabilized, and it is achieved that the tumble does not disintegrate during the compression stroke. Moreover, the allocation of the nozzle to the combustion chamber, as well as the design of the combustion chamber roof on the one side and of the recess in the piston bottom on the other side, results in the advantage of a long free stream of the injected fuel during an air-guided direct injection process.

What is claimed is:

1. In an internal combustion engine including an engine block having an end plane; a plurality of cylinders formed in the engine block and each having a cylinder axis; a piston disposed in each cylinder for reciprocating therein; a cylinder head positioned on the end plane of the cylinder block; each combustion chamber being bordered by a respective said piston and the cylinder head; each combustion chamber having a roof provided in the cylinder head and composed of first and second roof surfaces extending from the end plane at an inclination to the cylinder axis and meeting in a ridge line; two gas intake openings provided in said cylinder head and terminating in respective free edges on the first roof surface; at least one gas exhaust opening provided in said cylinder head and terminating in a free edge on the second roof surface; respective gas exchange valves seatable in the gas intake and gas exhaust openings; a fuel injection nozzle having an outlet opening and being supported in said cylinder head and having a nozzle axis oriented at an inclination to the end plane; and a spark plug supported in the cylinder head in a region of the roof;

the improvement wherein the first roof surface has, in a region of the outlet opening of the fuel injection nozzle, a shoulder covering a terminal edge of the cylinders and extending into each combustion chamber; further wherein the shoulder has a front face extending transversely to the nozzle axis and is more steeply angled with respect to the first roof surface; and further wherein the free edge of the gas intake openings in the cylinders intersects the ridge line.

2. The internal combustion engine as defined in claim 1, wherein each piston has a roof shaped upper terminal portion corresponding to the combustion chamber roof; and further wherein said roof shaped upper terminal portion is flattened.

3. The internal combustion engine as defined in claim 1, wherein said gas intake openings are arranged displaced in a direction toward said ridge line laterally outward.

4. The internal combustion engine as defined in claim 1, wherein said outlet opening of said fuel injection nozzle is recessed in said front face of said shoulder.

5. The internal combustion engine as defined in claim 4, wherein said outlet opening conically widens toward the combustion chamber.

6. In an internal combustion engine including an engine block having an end plane; a plurality of cylinders formed in the engine block and each having a cylinder axis; a piston disposed in each cylinder for reciprocating therein; a cylinder head positioned on the end plane of the cylinder block; each combustion chamber being bordered by a respective said piston and the cylinder head; each combustion chamber having a roof provided in the cylinder head and composed of first and second roof surfaces extending from the end plane at an inclination to the cylinder axis and meeting in a ridge line; two gas intake openings provided in said cylinder head and terminating in respective free edges on the first roof surface; at least one gas exhaust opening provided in said cylinder head and terminating in a free edge on the second roof surface; respective gas exchange valves seatable in the gas intake and gas exhaust openings; a fuel injection nozzle having an outlet opening and being supported in said cylinder head and having a nozzle axis oriented at an inclination to the end plane; and a spark plug supported in the cylinder head in a region of the roof;

the improvement wherein the first roof surface has, in a region of the outlet opening of the fuel injection nozzle, a shoulder covering a terminal edge of the cylinders and extending into each combustion chamber; further wherein said shoulder has a front face extending transversely to said nozzle axis and is more steeply angled with respect to said first roof surface; further wherein each piston has a roof shaped top corresponding to the combustion chamber roof and a recess matched to a course of said shoulder.

7. The internal combustion engine as defined in claim 6, wherein said recess is trough shaped and is oriented transversely to said ridge line.

8. The internal combustion engine as defined in claim 7, wherein said recess has a bottom having a bottom end oriented toward said gas exhaust opening; said bottom end has an upwardly curved course.

9. In an internal combustion engine including an engine block having an end plane; a plurality of cylinders formed in the engine block and each having a cylinder axis; a piston disposed in each cylinder for reciprocating therein; a cylinder head positioned on the end plane of the cylinder block; each combustion chamber being bordered by a respective said piston and the cylinder head; each combustion chamber having a roof provided in the cylinder head and composed of first and second roof surfaces extending from the end plane at an inclination to the cylinder axis and meeting in a ridge line; two gas intake openings provided in said cylinder head and terminating in respective free edges on the first roof surface; at least one gas exhaust opening provided in said cylinder head and terminating in a free edge on the second roof surface; the gas intake and gas exhaust openings each having an opening plane and each constituting valve seats for respective gas exchange valves; each valve seat having a valve seat axis oriented perpendicularly to the opening plane; each valve seat axis being inclined to a respective said cylinder axis and defining a valve angle; a fuel injection nozzle having an outlet opening and being supported in said cylinder head and having a nozzle axis oriented at an inclination to the end plane of said cylinder block; and a spark plug supported in the cylinder head in a region of the roof;

the improvement wherein the valve angle of said gas intake valves is approximately 20° and the valve angle of said gas exhaust valve is approximately 30°.

\* \* \* \* \*